United States Patent Office 3,634,312
Patented Jan. 11, 1972

3,634,312
STABLE CARBONATE POLYMER COMPOSITIONS
Robert C. Babillis and Frank N. Liberti, Mount Vernon, Ind., assignors to General Electric Company
No Drawing. Filed Aug. 19, 1969, Ser. No. 851,426
Int. Cl. C08g 51/58
U.S. Cl. 260—45.8 A                       6 Claims

ABSTRACT OF THE DISCLOSURE

A thermal-oxidatively stable polycarbonate composition which consists of in admixture a copolycarbonate phosphite and an epoxy composition which epoxy composition is present in an amount of 0.01–1.0 weight percent based on the total weight of the polycarbonate composition wherein the copolycarbonate phosphite has an elemental phosphorus content of 0.0005 to about 1.0 weight percent.

---

This invention is directed to a thermal-oxidatively stable polymeric composition and more particularly to a copolycarbonate phosphite having in admixture therewith an epoxy compound.

In the past, much effort has been expended in preparing thermally stable polycarbonate compositions which would be color stable at elevated temperatures and particularly at the high molding temperatures generally employed to prepare molded polycarbonate shapes. Many additives have been successfully employed to achieve this end. Particularly, for example, the use of organic phosphites as disclosed in U.S. Pat. 3,305,520 as an additive in admixture with a polycarbonate composition have been found helpful in rendering polycarbonates thermally stable. In addition, other stabilizer additives have been found useful such as tetra aryl-tin compounds disclosed in Canadian Pat. 727,700 which have shown some success in stabilizing polycarbonate compositions at elevated temperatures. In fact mixtures of various materials have also been used. In copending application Ser. No. 851,454 filed Aug. 19, 1969, there has been disclosed the preparation of a particular phosphite polycarbonate copolymer that has demonstrated excellent resistance to thermal degradation at elevated temperatures. While this particular polymer as disclosed therein has exhibited good thermal stability to color degradation at initial molding temperatures, it has now been surprisingly discovered that by the addition of a particular epoxy compound to the phosphite copolymeric material, further resistance to coloration after sustained or repeated exposure of the polymer to elevated temperatures has been demonstrated. This is surprising since the degree of protection against coloration at sustained or repeated exposure to elevated temperatures has not been fully demonstrated or fully achieved in the past.

Therefore it is an object of this invention to provide a novel thermal oxidatively stable polymeric composition.

Another object of this invention is to provide a thermal oxidatively stable copolycarbonate phosphite at sustained or repeated elevated temperatures.

These and other objects of this invention will become apparent from the following detailed description thereof.

Briefly, according to this invention, the foregoing and other objects are obtained by admixing with a copolycarbonate phosphite a particular epoxy compound in an amount of 0.01 to about 1.0 weight percent based on the total weight of the polymer composition. The copolycarbonate phosphite employed in combination with the epoxy compound has an elemental phosphorus content of 0.0005 to about 1.0 weight percent based on the weight of the copolycarbonate phosphite.

The following examples are set forth to illustrate more clearly the principle and practice of this invention to those skilled in the art. Unless otherwise specified, where parts or percents are mentioned they are parts or percents by weight.

EXAMPLE I

To a reactor fitted with a reflux condenser and mechanical agitator charge 1100 parts of methylene chloride, 150 parts of 2,2-bis(4-hydroxyphenyl) propane, 150 parts of calcium hydroxide, 3 parts of p-tertiary butylphenol and 0.018 part triethylamine. The slurry is stirred and phosgene is added at a rate of about 90 parts per hour. After 50 minutes, the phosgene addition is terminated. The polycarbonate in solid form is recovered by filtering and evaporation of the solvent. The product is dried over night at 125° C. The product is then fed to the extruder which is at a temperature of about 525° F. and pelletized.

This resin is designated as A.

EXAMPLE II

To a reactor fitted with a reflux condenser and mechanical agitator, charge 1100 parts of methylene chloride, 150 parts of 2,2-bis (4-hydroxyphenyl) propane, 150 parts of calcium hydroxide, 3 parts of p-tertiary butylphenol and 0.018 part of triethylamine. The slurry is stirred and 0.075 part of phosphorus trichloride is added based on the weight of 2,2-bis (4-hydroxyphenyl) propane. The phosgene addition is terminated after about 50 minutes.

The polymer is recovered as in Example I and is found to have an elemental phosphorus content of about 0.0035 weight percent of phosphorus as determined by Schoniger combustion described in Identification and Analysis of Plastics by Haslam and Willis, Iliffe Books, London 1965, page 8.

The polymer recovered is poly(bisphenol-A-carbonate-co-phosphite) and is designated as B.

EXAMPLE III

To the polymers so prepared in Examples I and II, 0.1 weight percent of 3,4-epoxy-cyclohexylmethyl 3,4-epoxy-cyclohexane carboxylate is blended with each separately and molded into test samples at various temperatures so indicated in Table 1 and are designated C and D respectively. Thermal stability to discoloration is measured in accordance with ASTM Yellowness Index Test D1925–63T on samples as molded and after heat aging the test samples for seven days at 284° F.

The polymers of Examples I and II are also molded into test samples at the various temperatures so indicated in Table 1 and discoloration is also determined by the Yellowness Index Test. The lower the Yellowness Index number, the lower is the discoloration of the polymer, and therefore the better is the thermal stability of the polymer. The results obtained are the average of three test samples each and are as follows:

TABLE 1

| Sample: | Yellowness index as molded | | Yellowness index after heat aging 7 days at 284° F. | |
|---|---|---|---|---|
| | 650° F. | 700° F. | 650° F. | 700° F. |
| A | 3.4 | 4.1 | 10.7 | 10.8 |
| B | 2.5 | 2.7 | 55.7 | 25.1 |
| C | 4.1 | 4.1 | 7.6 | 6.8 |
| D | 1.7 | 1.7 | 2.6 | 2.6 |

As shown in Table 1, the polymer containing phosphite within the polymer chain and having in admixture therewith an epoxy compound, which is test sample D has much better resistance to discoloration than the other samples.

The instant invention is directed to a thermal-oxidatively stable polymer composition comprising in admixture a copolycarbonate phosphite and an epoxy compound in an amount of 0.01 to 1.0 weight percent based on the total weight of the polymer composition. The copolycarbonate phosphite employed in the practice of this invention has an elemental phosphorus content of 0.0005 to about 1.0 weight percent based on the weight of the copolycarbonate phosphite. In particular the copolycarbonate phosphite is the reaction product of a dihydric phenol, a carbonate precursor and a phosphorus trihalide. More particularly, it is poly-(bisphenol-A-carbonate-co-phosphite). In preparing the copolycarbonate phosphite of this invention, the preferred phosphorus trihalide is phosphorus trichloride. The resulting polymer composition of this invention can be used for injection molding or blow molding applications. The polymer composition of this invention is particularly useful for blow molding applications when the polymer composition contains higher amounts of elemental phosphorus and in particular above about 0.02 weight percent. This is attributed to the fact that the polymer exhibits non-Newtonian flow characteristics at the higher phosphorus levels as compared to the Newtonian flow characteristics exhibited by carbonate homopolymers of 2,2-bis (4-hydroxyphenyl) propane (bisphenol-A) only or the copolycarbonate phosphite at the lower levels of elemental phosphorus. These Newtonian flow characteristics for bisphenol-A homopolymers are exhibited over essentially all melt processing conditions. Newtonian flow is defined as the type of flow occurring in a liquid system where the rate of shear is directly proportional to the shearing force. Non-Newtonian flow is observed when the rate of shear is not directly proportional to the shearing force.

The epoxy compound employed in the practice of this invention has the following formula:

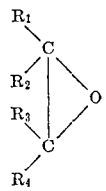

In the above formula $R_1$, $R_2$, $R_3$ and $R_4$ are independently selected from the group consisting of hydrogen, alkyl, cycloalkyl, aryl, substituted aryl and heterocyclic organic radicals wherein the organic radicals have a carbon content of 1 to 24 carbon atoms. While the actual number of hydrogen atoms employed may vary, it should be a function of the volatility of the epoxy compound. The number of hydrogen atoms should be such as to minimize the volatility of the epoxy compound since if the epoxy compound were to volatize at a low temperature, its benefit in use with a copolycarbonate phosphite would be lost at the molding temperatures employed in preparing molded articles from the composition of this invention.

The amount of epoxy employed in the practice of this invention can vary from 0.01 to 1.0 weight percent based on the weight of the polymer composition and is preferably 0.03 to 0.50 weight percent. While more than 1.0 weight percent of epoxy can be employed, it has been found that higher amounts tend to degrade the physical properties of the copolycarbonate phosphite and thereby reduce the usefulness of the polymer in providing tough, flexible molded articles.

In the practice of this invention, other epoxy compounds that have been employed in place of the 3,4-epoxy-cyclohexylmethyl 3,4-epoxycyclohexane carboxylate in the examples with essentially the same results are 3,4-epoxy-6-methylcyclohexyl-methyl 3,4-epoxy-6-methylcyclohexane carboxylate,
2,3-epoxy cyclohexylmethyl 3,4-epoxycyclohexane carboxylate,
4-(3,4-epoxy-5-methyl cyclohexyl) butyl 3,4-epoxycyclohexane carboxylate,
3,4-epoxycyclohexyl ethylene oxide,
di-3,4-epoxy-6-methylcyclohexylmethyl adipate,
cyclohexyl methyl 3,4-epoxy-cyclohexane carboxylate,
3,4-epoxy-6-methylcyclohexyl-methyl-6-methylcyclohexyl carboxylate,
bisphenol-A diglycidyl ether,
tetrabromobisphenol-A diglycidyl ether, diglycidyl ester of phthalic acid, diglycidyl ester of hexahydrophthalic acid, bis-epoxy dicyclopentadienyl ether of ethylene glycol, epoxidized soybeans oil, bis-epoxycyclohexyl adipate, butadiene diepoxide, tetraphenylethylene epoxide, indene oxide, octyl epoxy tallate, cyclododecane epoxide and epoxidized polybutadiene. Preferably the epoxy compound employed in the practice of this invention is 3,4-epoxy cyclohexylmethyl 3,4-epoxycyclohexane carboxylate.

The process for preparing the copolymeric composition of this invention comprises reacting a dihydric phenol with a carbonate precursor and a phosphorus trihalide in the presence of an acid acceptor and a molecular weight regulator. The phosphorus trihalide added to the reaction is about 0.0008 to about 0.20 mole thereof per mole of dihydric phenol. The phosphorus trihalide may be added before the reaction between the dihydric phenol and carbonate precursor commences or it may be added after the reaction commences. It is preferable in the practice of this invention that the phosphorus trihalide be added to the reaction before the reaction between the dihydric phenol and carbonate precursor commences. The phosphorus trihalides employed herein may be either phosphorus tribromide, phosphorus trichloride, phosphorus trifluoride or phosphorus tri-iodide. The reaction conditions may be those as set forth in U.S. Pats. 3,028,365; 3,290,409 or 3,305,520, all of which are hereby incorporated herein by reference.

The dihydric phenols that can be employed herein to prepare the copolymer of this invention are bisphenols such as bis(4-hydroxyphenyl)-methane, 2,2-bis(4-hydroxyphenyl)-propane, 2,2-bis(4-hydroxy-3-methylphenyl)propene, 4,4-bis(4-hydroxyphenyl)heptane, 2,2-bis(4-hydroxy 3,5-dichlorophenyl)-propane, 2,2-bis(4-hydroxy 3,5-dibromophenyl)-propane, etc., dihydric phenol ethers such as bis(4-hydroxyphenyl)-ether, bis(3,5-dichloro-4-hydroxyphenyl)-ether, etc., dihydroxydiphenyls such as p,p'-dihydroxydiphenyl, 3,3'-dichloro-4,4'-dihydroxydiphenyl, etc., dihydroxyaryl sulfones such as bis(4-hydroxyphenyl)-sulfone, bis(3,5-dimethyl-4-hydroxyphenyl)-sulfone, etc., dihydroxy benzenes, resorcinol, hydroquinone, halo- and alkyl-substituted dihydroxy benzenes such as 1,4-dihydroxy-2-chlorobenzene, 1,4-dihydroxy-2,5-dichlorobenzene, 1,4-dihydroxy-3-methylbenzene, etc., and dihydroxy diphenyl sulfoxides such as bis(4-hydroxyphenyl)-sulfoxide, bis-(3,5-dibromo-4-hydroxyphenyl)-sulfoxide, etc. A variety of additional dihydric phenols are also available to provide carbonate polymers and are disclosed in U.S. Pats. 2,999,835; 3,028,365 and 3,153,008. It is of course possible to employ two or more different dihydric phenols or a copolymer of a dihydric phenol with glycol or with hydroxy or acid terminated polyester, or with a dibasic acid in the event a carbonate copolymer or interpolymer rather than a homopolymer is desired for use in the preparation of the aromatic carbonate polymers of this invention.

The carbonate precursors employed in the practice of this invention can be either a carbonyl halide or a bishaloformate. The carbonyl halides which can be employed herein are carbonyl chloride, carbonyl bromide and mixtures thereof. The bishaloformates suitable for use herein include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

As stated previously, the reaction may be carried out in the presence of an acid acceptor which may be either an organic or an inorganic compound. A suitable organic acid acceptor is a tertiary amine and includes such materials as pyridine, triethylamine, dimethylaniline, tributylamine, etc. The inorganic acid acceptor may be one which can either be an hydroxide, a carbonate, a bicarbonate or a phosphate of an alkali or alkaline earth metal.

The molecular weight regulators which are also employed in carrying out the process for preparing the aromatic polycarbonate resins can be such molecular weight regulators as phenol, cyclohexanol, methanol, para-tertiarybutylphenol, para-bromophenol, etc. Preferably, para-tertiarybutylphenol is employed as the molecular weight regulator.

The poly(bisphenol - A - carbonate-co-phosphite) employed in this invention has the following repeating unit:

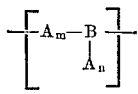

wherein A is

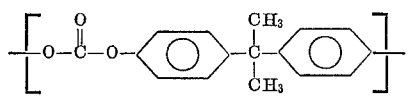

and wherein B is

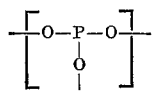

and wherein $m$ plus $n$ is 12 to about 24,000.

It will thus be seen that the objects set forth above among those made apparent from the preceding description are efficiently attained, and since certain changes may be made in carrying out the above process and in the composition set forth without departing from the scope of this invention, it is intended that all matters contained in the above description shall be interpreted as illustrative and not in a limiting sense.

What is claimed is:

1. A thermal-oxidatively stable polymer composition comprising in admixture a copolycarbonate phosphite and an epoxy compound in an amount of 0.01 to 1.0 weight percent based on the total weight of the polymer composition and wherein said copolycarbonate phosphite has an elemental phosphorus content of 0.0005 to about 1.0 weight percent based on the weight of the copolycarbonate phosphite and said epoxy compound has the following formula:

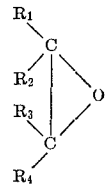

wherein $R_1$, $R_2$, $R_3$ and $R_4$ are independently selected from the group consisting of hydrogen, alkyl, cycloalkyl, alkyl substituted cycloalkyl, aryl, substituted aryl radicals and mixtures thereof.

2. The composition of claim 1 wherein the amount of epoxy compound is 0.03 to 0.50 weight percent.

3. The composition of claim 1 wherein the epoxy compound is an epoxidized cycloaliphatic compound.

4. The composition of claim 1 wherein the epoxy compound is 3,4-epoxy cyclohexylmethyl 3,4-epoxycyclohexane carboxylate.

5. The composition of claim 1 wherein the copolycarbonate phosphite is poly - 2,2 - bis(4-hydroxyphenyl)propane carbonate-co-phosphite.

6. The composition of claim 1 wherein the copolycarbonate phosphite has an elemental phosphorus content of 0.0005-0.10 weight percent.

References Cited

UNITED STATES PATENTS

| | | | |
|---|---|---|---|
| 3,210,318 | 10/1965 | Dolce et al. | 260—45.8 |
| 3,378,523 | 4/1968 | Caldwell et al. | 260—47 |
| 3,489,716 | 1/1970 | Calkins | 260—45.8 |

DONALD E. CZAJA, Primary Examiner

R. A. WHITE, Assistant Examiner

U.S. Cl. X.R.

260—47 XA